Oct. 9, 1923.
G. C. KENNEDY
COMBINATION CONTAINER
Filed Jan. 21, 1922
1,469,938
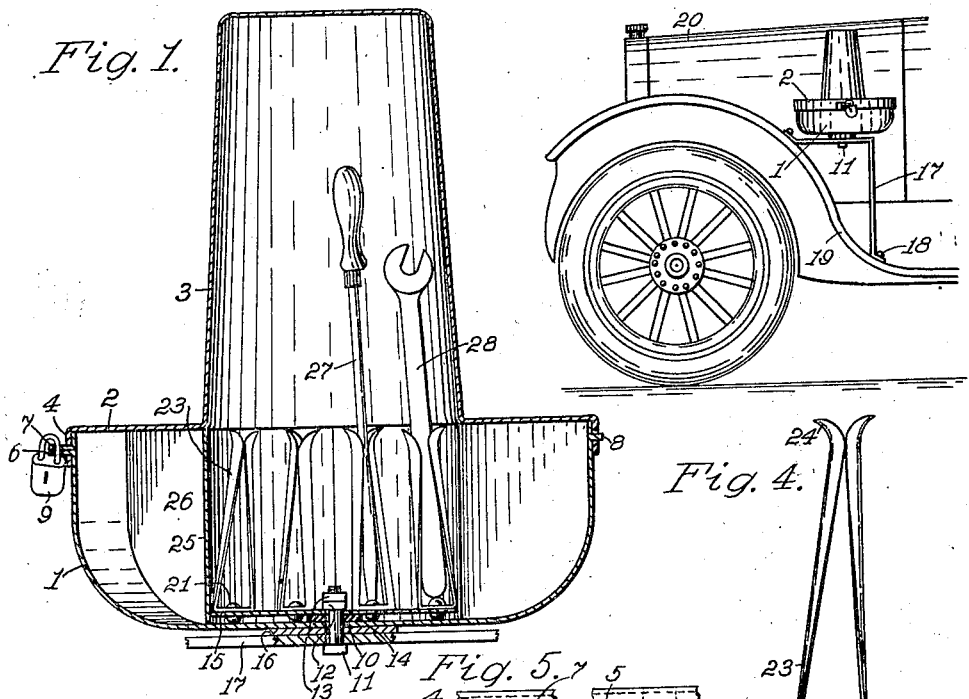
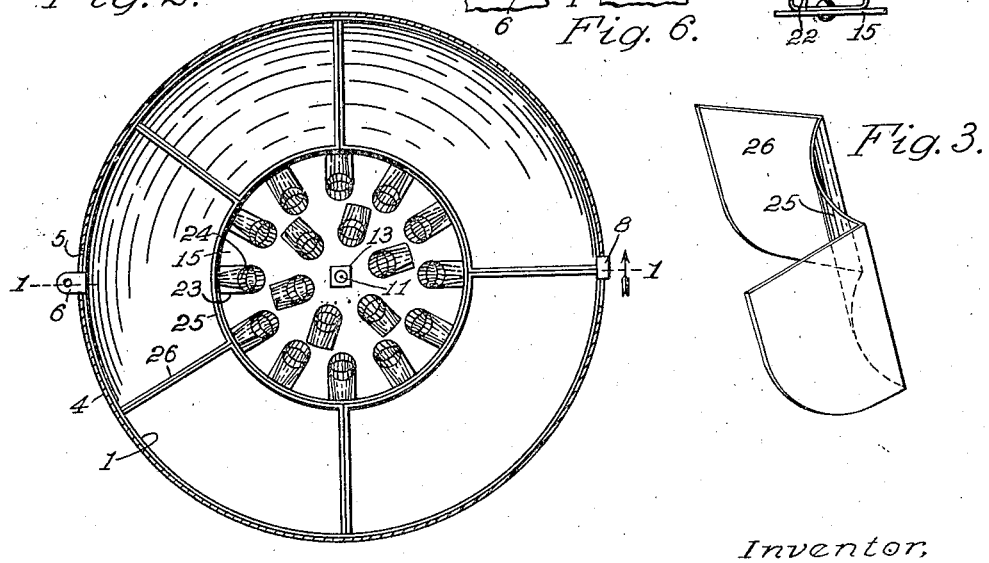
Inventor,
George C. Kennedy.

Patented Oct. 9, 1923.

1,469,938

UNITED STATES PATENT OFFICE.

GEORGE COLVIN KENNEDY, OF WATERLOO, IOWA.

COMBINATION CONTAINER.

Application filed January 21, 1922. Serial No. 530,950.

*To all whom it may concern:*

Be it known that I, GEORGE COLVIN KENNEDY, a citizen of the United States of America, and a resident of Waterloo, Blackhawk County, Iowa, have invented certain new and useful Improvements in Combination Containers, of which the following is a specification.

My invention relates to improvements in combination containers, and the objects of my improvements are, first, to supply a device of this class which may be rotatably mounted on any suitable support for convenient rotary adjustment thereof; and second, to so subdivide its interior space, and provide such releasable holding - means therein as will fit the device to receive objects of various shapes for quick deposit and as ready selective removal thereof.

I have accomplished these objects by the means which are hereinafter described and claimed, and which are illustrated in the accompanying drawings, in which Fig. 1 is a vertical axial section of my improved rotatable container and its cover closure, and Fig. 2 is a top plan of the container, the closure shown in horizontal section. Fig. 3 is a perspective view of one of the removable division-devices, and Fig. 4 is an elevation of one of the resilient clips. Figs. 5 and 6 are respectively fragmental elevations of overlapped parts of the closure and container which comprehend the bayonet-joints thereof. Fig. 7 is a side elevation, on a reduced scale, of one of my combination containers mounted or bracketed upon a front mud-guard of a motor-car.

In said drawings, similar numerals of reference denote corresponding parts throughout the several views.

The receptacle of my device is a bowl-shaped body 1, which may be die-pressed from sheet metal, and has an axial bearing-orifice 10 in its bottom.

The closure-cover for the open top of the receptacle 1 may be of any desired shape, but a preferred form is shown in said Fig. 1. This consists of a die-pressed imperforate cover whose central raised part 3 may be cylindric or slightly frustal, of sufficient height, and having a basal horizontal annular rim or wide margin 2 which overlies the bowl below, this margin having a peripheral depending annular flange 4 which fits closely over and about the abutting upper outer surface of the bowl or receptacle rim. I have arranged a bayonet-joint connection at each of opposite sides of the said receptacle and closure as shown in Figs. 5 and 6. The like bayonet-joints 5 of angular shape are cut in the depending rim 4. The wider of the joints shown in Fig. 5 receives an orificed ear 7 which latter overlies another orificed ear 6 which is bent over from the slitted depending part 4 of the closure. The loop of a padlock 9 may be passed through the registering orifices of these ears to lock them together, and while the imperforate lug 8 at the opposite side of the container and cut therefrom is seated in like manner in the inner end part of the joint 5.

The interior space of the receptacle 1 may be subdivided or partitioned in any way desired to supply a number of open top compartments. In order to reserve a cupped or axially cylindric compartment, I have arranged a number of compartments around this central compartment, by assembling removably division-devices as shown in Fig. 3. Each of these division-devices comprises an arcuate middle part 25 having at opposite ends angularly directed parts 26. When the requisite number of said devices have been fitted together within the receptacle, they form a closed circle of compartments, interlocked against relative movements, but separable vertically. These division-devices may be alike in dimensions to supply compartments of the same size, or as shown, may differ in length. As the lower part of the receptacle 1 is preferably rounded for convenience in manual removal of the contents of said compartments, the lower edges of the device parts 26 are similarly curved to fit. It will be observed that the cover part 2 lies flatly upon the upper horizontal edges of the division-devices, securely closing the compartments.

The cylindric axially-located central compartment may be left empty to receive any articles placed therein, as for instance, any elongated bodies which may stand on end to project upwardly into the centrally-elongated part 3 of the cover, such as tools 27 and 28 shown in Fig. 1. To prevent confusion or mixing of the tools together indistinguishably, I have furnished spring-clips to individually receive the tools, so that any tool may be readily distinguished from the others, for quick recognition and removal or replacement, and in order also to prevent jarring and noises while the device is carried about.

These clips may be riveted or otherwise secured upon a flat plate 15, preferably circular to fit the bottom of the cylindric compartment, the lower rivet-heads 21 resting on the bottom of the receptacle, or the plate may be centrally supported upon an elastic washer 14. A short bolt 11 forms a pintle for the receptacle to rotate upon, being passed upwardly through an orificed support, such as the bar or bracket 17, then through a wide metal washer 16, and then through the central orifice 10 and through said washer 14 and a central orifice in the plate 15, and be secured by nuts 12 and 13.

The spring-clips may be of any number and arrangement upon the plate 15. They are shown in concentric circles, in staggered relation. Each spring-clip consists of die-pressed spring clips or jaws 23 connected at the bottom by a horizontal part 22, and each member 23 is longitudinally troughed inwardly and terminally bent outwardly. These jaws are terminally in contact, so that when a body as a tool 27 or 28 is passed downwardly between them through their terminal lips, they will react to hold the object tightly, isolating it from the others, and preventing noisy contacts, though permitting easy withdrawal of the object, as selected when the receptacle has been rotated appropriately to bring the tool into view.

As the spring-clips are somewhat inclined inwardly, the contained objects cannot contact with the inner wall of the closure-part 3, so that knocking is avoided, and interference in the replacement of the closure is prevented.

My rotatable container may be mounted for use in any place, such as a workshop, office, kitchen, but is especially suitable for use on motor-cars of any description. As shown in Fig. 7 it may be mounted on a front mud-guard 19 of a motor-car 20 on an angular bracket-bar 17 riveted at 18 to the guard, or it may be mounted elsewhere on said vehicle. As the nuts 12 and 13 are within the locked receptacle, the device is irremovable when locked, without the exercise of a destroying implement upon it.

Having described my invention, what I claim as new, and desire to secure by Letters Patent, is:

1. In combination, an open receptacle, removable partitioning devices therein to provide a plurality of open top compartments around a central open top compartment whose wall is made up of parts of said devices, and a removable closure for the receptacle having a raised cupped part over the central compartment only, the closure having a circumferential rim serving to close the other compartments to isolate them from each other and said central compartment.

2. In combination, an open top receptacle, and a plurality of division-devices mounted interlockingly and removably therein, each division-device consisting of a single plate bent to have partition parts when assembled with the others in the receptacle.

3. In combination, an open top receptacle, and a plurality of division-devices mounted interlockingly and removably therein about a central cupped compartment, said division-devices having contacting parts extending from middle parts.

4. In combination, an open top receptacle, and a plurality of division-devices arranged circularly around the interior thereof to provide open top compartments about a central compartment, and engaging-means mounted in said central compartment to releasably clutch received articles.

5. In combination, a circular bowl receptacle mounted for rotation, a closure therefor, removable division-devices within said receptacle, and means within said receptacle for holding elongated objects therein in upright positions and arranged circularly therein concentrically.

6. In combination, a supporting bracket, an open top receptacle rotatably and removably mounted thereon, a base-plate mounted removably in said receptacle, a plurality of coacting spring-clips mounted on said base-plate, an inclosure surrounding said base-plate spaced from the inner wall of the receptacle, and a movable closure for the open top of the receptacle.

7. In combination, an open top bowl, supporting-means on which it is rotatably mounted, a closure for said bowl, means for lockingly releasably securing said closure upon the bowl, a base-plate removably mounted within the bowl, and engaging-devices mounted upon said base-plate.

8. In combination, a supporting device, a carrying-device horizontally rotatable upon said supporting-device, and engaging-devices mounted upon said carrying-device to receive and hold releasably elongated objects in upright positions in a determined relative arrangement, said carrying-device having a plurality of removable partitioning devices surrounding said engaging-devices to isolatedly carry removable articles.

9. In combination, an open receptacle, and a plurality of division-devices mounted interlockingly and removably therein, each division-device consisting of a single element shaped angularly to have partition parts when assembled with the others in the receptacle.

Signed at Waterloo, Iowa, this 23d day of Dec. 1921.

GEORGE COLVIN KENNEDY.